(12) United States Patent
Murakami et al.

(10) Patent No.: US 6,966,558 B2
(45) Date of Patent: Nov. 22, 2005

(54) SEALING DEVICE FOR ROLLING BEARING

(75) Inventors: Yukitoshi Murakami, Nara (JP); Yoshitaka Nakagawa, Aichi (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/808,355

(22) Filed: Mar. 25, 2004

(65) Prior Publication Data

US 2004/0188951 A1 Sep. 30, 2004

(30) Foreign Application Priority Data

Mar. 31, 2003 (JP) .................... P.2003-095810

(51) Int. Cl.⁷ .............................. F16J 15/32
(52) U.S. Cl. ....................... 277/549; 277/570
(58) Field of Search ................ 277/549–563, 277/570

(56) References Cited

U.S. PATENT DOCUMENTS

| | | |
|---|---|---|
| 6,334,615 B1 | 1/2002 | Uchiyama et al |
| 2002/0154838 A1 | 10/2002 | Yabe et al. . |
| 2003/0127803 A1 | 7/2003 | Yokoyama et al. |
| 2003/0198417 A1 * | 10/2003 | Yamamoto et al. ......... 384/492 |

FOREIGN PATENT DOCUMENTS

| | | |
|---|---|---|
| JP | 10-26143 | 1/1998 |
| JP | 10-026143 | 1/1998 |
| JP | 2001-304280 | 10/2001 |

* cited by examiner

*Primary Examiner*—Enoch Peavey
(74) *Attorney, Agent, or Firm*—McGinn IP Law Goup, PLLC

(57) ABSTRACT

A sealing device for a rolling bearing includes: a seal mounting groove formed to a shoulder of a raceway groove of a fixed ring; a circumferential step formed to a shoulder of the raceway groove of the rotational ring; and an annular resilient sealing member fit into the seal mounting groove, a sealing lip of the sealing member being brought into contact with a lateral surface of the circumferential step. The sealing member includes a fluoro resin and 10–60 parts by weight of a filler based on 100 parts by weight of the fluoro resin, and the filler includes a first filler having a Mohs hardness of 6 or more and 8 or less in amount of 25%–75% by weight or less of the filler, and a second filler having a Mohs hardness of less than 6 as the remaining portion.

17 Claims, 2 Drawing Sheets

SEALING DEVICE FOR ROLLING BEARING

BACKGROUND OF THE INVENTION

The present invention concerns a sealing device for a rolling bearing capable of maintaining a high sealing performance for a long time even under high speed rotation and high temperature circumstances.

A sealing device for a rolling bearing is disposed for preventing leakage of a lubricant sealed in the inside of the bearing and preventing intrusion of obstacles from the outside of the bearing. Particularly, in a sealing for a bearing having a worry of splash of water containing fine solids such as muddy water, for example, a bearing device used for auxiliary equipments of automobile engines. (alternators, etc.) high water proofness and dust proofness are required. Accordingly, a resilient annular sealing member is used for the sealing device and it has been adopted a structure of bringing a lip formed at the end of the sealing member into contact with a lateral side of a circumferential step (sealing groove) formed to the shoulder of a raceway groove in a rotational ring.

FIG. 1 is a cross sectional view showing the structure of an existent rolling bearing device used, for example, in an alternator. The rolling bearing comprises an inner ring (rotational ring) 1 having a side raceway groove 1u for an inner ring, an outer ring (fixed ring) 2 having a side raceway groove 2u for an outer ring, a plurality of balls 3 and a cage 4 for holding the balls 3 circumferentially each at a predetermined distance. A seal mounting groove 2x and a circumferential step (sealing groove) 1s are formed to the shoulder of the raceway groove 1u for the inner 1 ring and the shoulder of the raceway groove 2u for the outer ring 2 respectively. Further, a lubricant such as grease not illustrated is sealed in an annular space defined between the inner ring 1 and the outer ring 2, and annular seal members 5, 5 are disposed to the openings on both ends thereof for sealing the annular space.

The sealing member 5 constituting the sealing device comprises a core metal 5c made of a thin metal plate, a seal main body 5a made of rubber (or resin) formed so as to cover the core metal 5c and a lip 5b formed integrally so as to protrude to the inner circumference of the seal main body 5a. Further, the lip 5b is formed such that when the base of the seal main body 5a is fit into a seal mounting groove 2x, the top end thereof is in contact with the lateral side 1t of the circumferential step is formed to the inner ring 1.

In some bearing devices, a slinger 12 in contact with the end face of the bearing inner ring is disposed to form a labyrinth between the sealing member 5 and the slinger 12 to improve the muddy water proofness (refer to Patent Document 1 and Patent Document 2).

For the material constituting the sealing member 5, nitrile rubber, acryl rubber or the like is used generally, and materials mainly comprising a fluoro rubber or fluoro resin excellent in heat resistance and wear resistance are used suitably for bearing rotating at high speed under high temperature circumstance (for example, a highest working temperature of 170° C. or higher) such as bearings for use in alternators.
Patent Document 1
  JP-A No. 10-26143
Patent Document 2
  JP-A No. 2001-304280

However, in the sealing device for a rolling bearing described above, when a fluoro resin (or fluoro rubber) is used for the material of the sealing member 5, lateral surface 1t of the circumferential step on the side of the raceway track of the bearing ring in sliding contact with the lip 5b of the sealing member is sometimes worn to lower the sealing performance in an early stage.

Further, in a case where the worn powder intrudes inside the bearing, it may be a worry of causing wear in the raceway leading to fracture of the bearing.

SUMMARY OF THE INVENTION

The present invention has been achieved in view of the foregoing situations and intends to provide a sealing device for a rolling bearing using a fluoro resin excellent in heat resistance for the material of the sealing member constituting the sealing device, and yet suffering from less wear for the circumferential step on the side of the bearing ring in sliding contact with the lip of the sealing member and capable of maintaining a favorable sealing performance for a long time even under a high temperature circumstance.

For attaining the foregoing object, the present invention provides, in a first feature, a sealing device for a rolling bearing comprising: a fixed ring including raceway groove; a seal mounting groove formed to a shoulder of the raceway groove; a rotational ring including raceway groove;

a circumferential step formed to a shoulder of the raceway groove of the rotational ring; and an annular resilient sealing member fit into the seal mounting groove, a sealing lip of the sealing member being brought into contact with a lateral surface of the circumferential step, in which the sealing member includes a fluoro resin and 10 parts by weight or more and 60 parts by weight or less of a filler based on 100 parts by weight of the fluoro resin, and the filler includes a first filler having a Mohs hardness of 6 or more and 8 or less in amount of 25% by weight or more and 75% by weight or less of the filler, and a second filler having a Mohs hardness of less than 6 as the remaining portion.

In a preferred embodiment of the invention, it is preferred to use $SiO_2 \cdot nH_2O$ as a specific example of the first filler having the Mohs hardness of 6 or more and 8 or less. and carbon black as a specific example of the second filler having a Mohs hardness of less than 6.

The fluoro resin (or fluoro) rubber used as the sealing member required for heat resistance has a property being excellent in heat resistance but tending to cause wear for the mating sliding member. The material used for the sealing member also includes processing aids such as vulcanizes, colorants, lubricants or anti-aging agents, or fillers. The filler is blended for reinforcement and cost down of the resin (so-called reinforcing filler) and includes carbon black such as furnace black and thermal black, and white carbon, clay, talc, calcium carbonate, diatomaceous earth and wollastonite generally referred to as white fillers. The carbon black and the white filler described above are often used in admixture in actual blend. Among the white fillers, white carbon having higher reinforcing effect (Mohs hardness of about 7) has higher hardness compared with relatively soft carbon black (Mohs hardness 1 to 2) and is considered to have a great concern with the wear of the bearing ring (Mohs hardness 6 to 7).

In view of the above, the present inventors have made studies taking notice on the reinforcing filler, particularly, white carbon and have found that wear in both of the sliding mating member and the sealing member per se can be decreased by making the blending amount appropriate.

That is, in the invention, the total amount of the filler blended with the resilient sealing member is determined while considering the soft and flexibility and dynamic physical property of the sealing member. The amount of the filler is from 10 parts by weight or more and 60 parts by weight or less, preferably, 20 parts by weight or more and 50 parts by weight or less based on 100 parts by weight of the fluoro resin. In a case where the total amount of the filler is less than 10 parts by weight based on 100 parts by weight of the fluoro resin, it can not satisfy trackability, tensile strength, tear strength, and hardness required for the sealing member. On the other hand, in a case where the total amount of the filler exceeds 60 parts by weight based on 100 parts by weight of the fluoro resin, it lacks in the soft and flexibility as the sealing member and trackability, mountability and sealing performance are deteriorated.

Further, the ratio of the relatively hard ingredient (first filler having Mohs hardness of 6 or more and 8 or less) blended in the filler is determined while considering the wear in the lip of the sealing member and the circumferential step on the side of the bearing ring. In a case where the ratio of the first filler is less than 25% by weight, the sealing lip is worn in an early stage. On the other hand, in a case where the ratio of the first filler exceeds 75% by weight, it causes wear in the bearing ring.

Accordingly, it is desirable that the remaining ingredient of the filler (that is, second filler) is preferably a relatively soft filler having a Mohs hardness of less than 6. By applying the blending ratio described above to the resilient sealing member comprising the fluoro resin, even in a rolling bearing rotating at high speed under high temperature circumstance, both the sealing member per se and the circumferential step on the side of the bearing ring suffer from less wear and satisfactory sealing performance can be kept for a long time.

While here is no particular restriction on the kind of the reinforcing filler, $SiO_2 \cdot nH_2O$ (silicon dioxide n-hydrate, referred to as "white carbon", "synthesis silicic acid" or "hydrate silica", or sometimes simply as "silica") is preferred considering dispersibility and reinforcing effect to the fluoro resin, the wear resistance and the cost of the fluoro resin as the first filler having the Mohs hardness of 6 or more and 8 or less. Further, carbon black, talc (Mohs hardness 1 to 2), clay (Mohs hardness about 2), diatomaceous earth (Mohs hardness 1 to 1.5) and mica (Mohs hardness about 3), etc. can be used as the second filler having the Mohs hardness of less than 6. Among them, carbon black (particularly, thermal black such as "FT carbon" and "MT carbon") is preferred

DETAILED DESCRIPTION OF PREFERRED EMBODIMENTS

Figure 1:
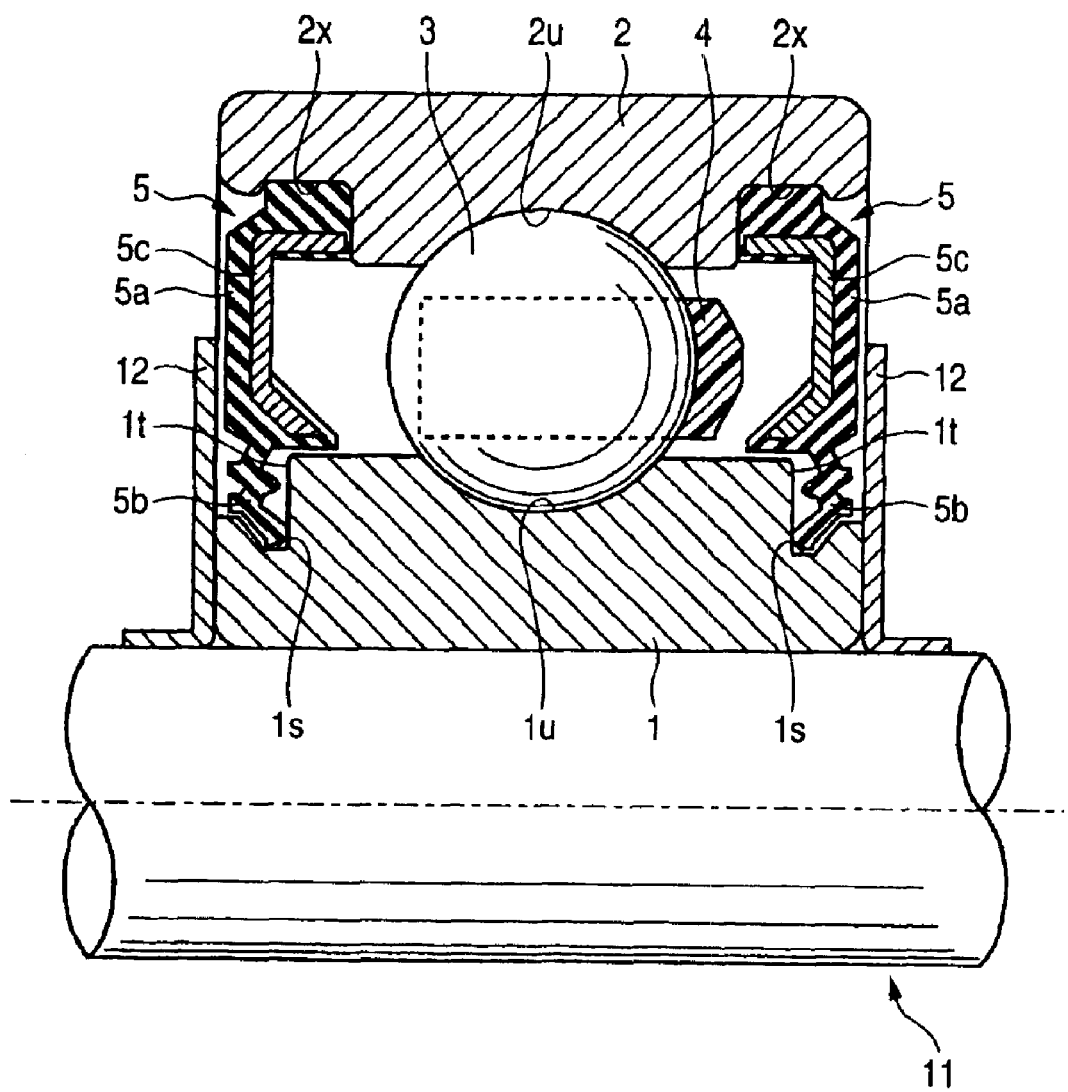
FIG. 1 is a cross sectional view showing the structure of a sealing device for a rolling bearing.

Preferred embodiments of the invention are to be described. Since the structure of the sealing device for a rolling bearing in this embodiment is identical with that of the existent example shown in FIG. 1, detailed descriptions are to be omitted.

The feature of the resilient sealing member 5 in this embodiment resides in a blending ratio of materials constituting the sealing member 5. The sealing member 5 is formed, for example, of a fluoro rubber comprising a copolymer of vinyldene fluoride and hexafluro propylene as a main ingredient, in which 35 parts by weight of a filler and 10 parts by weight of a processing aid (vulcanization aid) are added based on 100 parts by weight of the fluoro rubber in the material. Further, the filler comprises a mixture of white carbon (Mohs hardness 7) and MT black (Mohs hardness 1–2) at a weight ratio of 10:25.

The sealing member 5 can be prepared by adding a filler and various kinds of processing aids required for vulcanization or fabrication to a fluoro rubber ingredient, then mixing them by a known kneading method such as roll mixing, kneader mixing, banbury mixing or the like and then molding the resultant composition under vulcanization into a desired shape. Further, a known molding method such as injection molding, heat pressing or extrusion molding can be used for the molding.

With the constitution described above, the sealing member 5 can prevent wear on the lateral surface it of the circumferential step 1s for the inner ring in sliding contact with the sealing member 5 even under the conditions liable to cause wear such as low lubrication and high surface pressure. Further, the sealing member is formed of the fluoro rubber of excellent heat resistance and the lip 5b of the seal member 5 per se suffer from less wear. Accordingly, the sealing device in this embodiment can maintain satisfactory sealing performance for a long time even in a rolling bearing that rotates at a high speed under high temperature circumstance.

In the embodiment described above, the material for the sealing member comprises a vinylidene fluoride type rubber (FKM), but the fluoro resin material constituting the sealing device is not restricted only thereto in the invention. For example, tetrafluoroethylene—propylene rubber (FEPM), tetrafluoroethylene—perfluoro methyl ether rubber (FFKM), other binary or ternary fluoro resins, or resins comprising the combination thereof can also be used.

Further, the sealing member of the invention may be incorporated with known additives such as vulcanizer (crosslinker), vulcanization aid, plasticizer, anti-aging agent, colorant, lubricant and stabilizer within range not deteriorating the excellent wear resistance or sealing performance thereof.

Then, in order to confirm the effect of the sealing device for a rolling bearing in the embodiment described above, a wear test was conducted by using test specimens having same blending composition as that for the sealing member, and the result is to be described.

Figure 2:
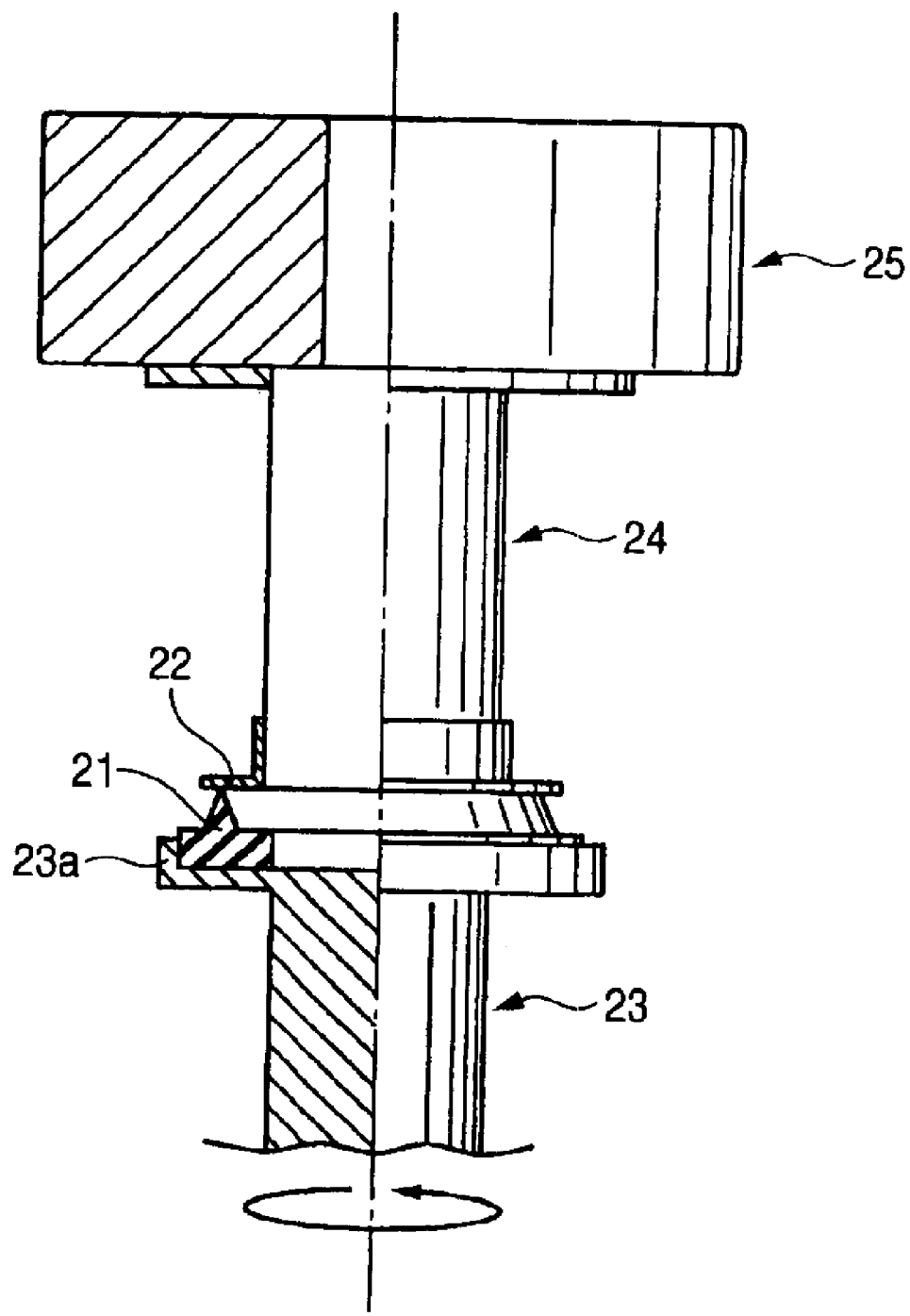
FIG. 2 is a partially cross sectioned view showing the outline of a testing equipment used for a wear test.

FIG. 2. is a partially cross sectioned view showing a structure of a testing equipment used for the wear test. The testing equipment is adapted to relatively rotate a test piece 21 and a friction plate 22 disposed coaxially under a predetermined load, thereby measuring the wear amount respectively. The test piece 21 comprising the fluoro rubber is formed as an annular shape having a protrusion substantially of a trigonal cross section such that it is in contact at the top end of the protrusion with the friction plate 22 comprising SUS 304. In the drawing, are shown a rotational shaft 23, a fixed shaft 24 and a weight 25. Further, the test piece 21 is located on a turn table 23 disposed at one end of the rotational shaft 23, and the other end (not illustrated) of the rotational shaft 23 is connected with a rotational driving source such as a motor.

Table 1 shows the blending composition for each of the test specimens. Each of the test specimens was vulcanized (crosslinked) by a primary pressing vulcanization at 180° C. for 5 min and a secondary oven vulcanization at 230° C. for 24 hours to obtain rubber molding products.

TABLE 1 unit: PHR

| Blending ingredient Parts by weight | Fluoro resin | White carbon | MT black | Crosslinker (polyol) | Processing aid (antioxidant, etc) |
|---|---|---|---|---|---|
| Example 1 (weight ratio) | 100 (68.03 wt %) | 10 (6.80 wt %) | 25 (17.01 wt %) | 2 (1.36 wt %) | 10 (6.80 wt %) |
| Comp. Example 1 (weight ratio) | 100 (68.03 wt %) | 30 (20.41 wt %) | 5 (3.40 wt %) | 2 (1.36 wt %) | 10 (6.80 wt %) |
| Comp. Example 2 (weight ratio) | 100 (68.03 wt %) | 0 (0.00 wt %) | 35 (23.81 wt %) | 2 (1.36 wt %) | 10 (6.80 wt %) |

In each of the test specimens, 35 parts by weight of the filler, 2 parts by weight of the crosslinker and 10 parts by weight of the processing aid (anti-oxidant, etc.) are added respectively based on 100 parts by weight of the fluoro resin comprising a copolymer of vinylidene fluoride and hexafluoro propylene. The composition of the crosslinker and the processing aid is identical in each of the test specimens and the ratio of the white carbon based on the entire amount of the filler for the sum of white carbon and MT carbon is about 28.6% by weight in Example 1, about 85.7% by weight in Comparative Example 1 and 0% by weight in Comparative Example 2.

Test Condition

| Load: | 9.8 N |
|---|---|
| Number of rotation: | 2625 rpm |
| Lubricant: | Coated thinly on the surface of test specimen before starting test (lubricant: Fluoro grease). Not supplemented during test |
| Test time: | 3.6 hours |
| Temperature: | room temperature |

For the wear amount, the wear amount (change in thickness) at the portion of contact was measured for the test specimen 11 and the friction plate 22 after the end of the test respectively. The result is shown in Table 2.

TABLE 2

|  | Test specimen (fluoro rubber) Wear amount | Friction plate (SUS 304) Wear amount |
|---|---|---|
| Example 1 | 0.21 | 0 |
| Comp. Example 1 | 0.36 | 7 |
| Comp. Example 2 | 3.27 | 0 |
|  | Unit: mm | Unit: μm |

As apparent from Table 2, in a case where the filler only consists of MT carbon (carbon black) (Comparative Example 2), the fluoro rubber corresponding to the sealing member is worn greatly. Further, in a case where the blending amount of white carbon is excessive (Comparative Example 1), wear occurs in the friction plate corresponding to the bearing ring of a rolling bearing. In comparison with them, in Example 1 applied with the blend of the invention, it is observed that the friction plate suffers from no wear and the wear is reduced also for the fluoro rubber.

As has been described above specifically, according to the sealing device for a rolling bearing of the present invention, both the sealing member per se and the circumferential step of the rolling ring less suffer from wear and satisfactory sealing performance can be maintained for a long time.

What is claimed is:

1. A sealing device for a rolling bearing comprising:
   a fixed ring including raceway groove;
   a seal mounting groove formed to a shoulder of the raceway groove;
   a rotational ring rotatable with respect to the fixed ring, including a raceway groove;
   a circumferential step formed on a shoulder of the raceway groove of the rotational ring; and
   an annular resilient sealing member fit into the seal mounting groove, a sealing lip of the sealing member being brought into contact with a lateral surface of the circumferential step,
   wherein the sealing member includes a fluoro resin and a filler in an amount in a range of about 10 parts to 60 parts by weight based on 100 parts by weight of the fluoro resin,
   wherein the filler includes a first filler having a Mohs hardness in a range of about 6 to 8 in an amount in a range of about 25% to 75% by weight of the filler, and a second filler having a Mohs hardness of less than 6.

2. The sealing device according to claim 1, wherein the first filler includes $SiO_2 \cdot nH_2O$ and the second filler comprises a carbon black.

3. The sealing device according to claim 1, wherein the sealing member includes the filler in an amount in a range of about 10 parts to 60 parts by weight based on 100 parts by weight of the fluoro resin.

4. The sealing device according to claim 1, wherein the fluoro resin comprises at least one of a vinylidene flouride type rubber (FKM), a tetrafluoroethylene-propylene rubber (FEPM), a tetrafluoroethylene-perfluoro methyl ether rubber (FFKM), a binary fluoro resin, and a ternary fluoro resin.

5. The sealing device according to claim 1, wherein the second filler comprises at least one of carbon black, talc, clay, diatomaceous earth, and mica.

6. A sealing member comprising:
   a fluoro resin; and
   a filler in an amount in a range of about 10 parts to 60 parts by weight per 100 parts by weight of the fluoro resin,
   wherein the filler comprises a first filler having a Mohs hardness in a range of about 6 to 8 in an amount in a range of about 25% to 75% by weight of the filler and a second filler having a Mohs hardness of less than 6.

7. The sealing member according to claim 6, wherein a balance of the weight of the filler comprises the second filler.

8. The sealing member according to claim 6, wherein the fluoro resin comprises at least one of a vinylidene flouride type rubber (FKM), a tetrafluoroethylene-propylene rubber (FEPM), a tetrafluoroethylene-perfluoro methyl ether rubber (FFKM), a binary fluoro resin, and a ternary fluoro resin.

9. The sealing member according to claim 6, wherein the first filler comprises silicon dioxide n-hydrate.

10. The sealing member according to claim 6, wherein the second filler comprises at least one of carbon black, talc, clay, diatomaceous earth, and mica.

11. The sealing member according to claim 6, wherein the sealing member comprises filler in a range of about 20 parts to 50 parts by weight per 100 parts by weight of the fluoro resin.

12. A composition for a sealing member comprising:
   a fluoro resin; and
   a filler in an amount in a range of about 10 parts to 60 parts by weight per 100 parts by weight of the fluoro resin,
   wherein the filler comprises a first filler having a Mohs hardness in a range of about 6 to 8 in an amount in a range of about 25% to 75% by weight of the filler and a second filler having a Mohs hardness of less than 6.

13. The composition according to claim 12, wherein a balance of the weight of the filler consists essentially of the second filler.

14. The composition according to claim 12, wherein the fluoro resin comprises at least one of a vinylidene flouride type rubber (FKM), a tetrafluoroethylene-propylene rubber (FEPM), a tetrafluoroethylene-perfluoro methyl ether rubber (FFKM), a binary fluoro resin, and a ternary fluoro resin.

15. The composition according to claim 12, wherein the first filler consists essentially of silicon dioxide n-hydrate.

16. The composition according to claim 12, wherein the second filler comprises at least one of carbon black, talc, clay, diatomaceous earth, and mica.

17. The composition according to claim 12, wherein the sealing member consists essentially of filler in a range of about 20 parts to 50 parts by weight per 100 parts by weight of the fluoro resin.

* * * * *